Oct. 26, 1965   R. E. SCALES   3,213,820
CONTAINER FOR TRANSPORTING BULK DRY GRANULAR MATERIAL
Filed May 28, 1963   3 Sheets-Sheet 1

INVENTOR.
Ralph E. Scales

Oct. 26, 1965 R. E. SCALES 3,213,820
CONTAINER FOR TRANSPORTING BULK DRY GRANULAR MATERIAL
Filed May 28, 1963 3 Sheets-Sheet 2
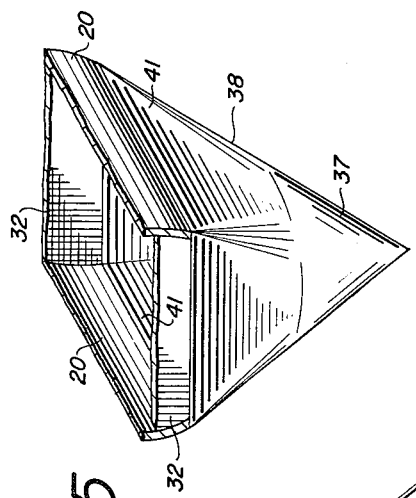
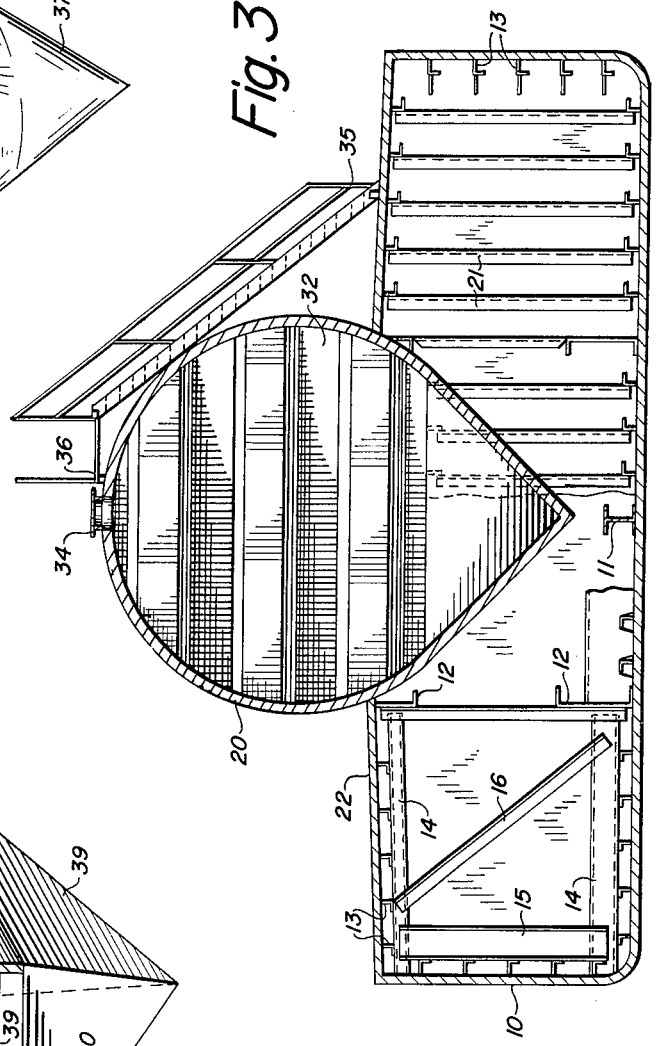
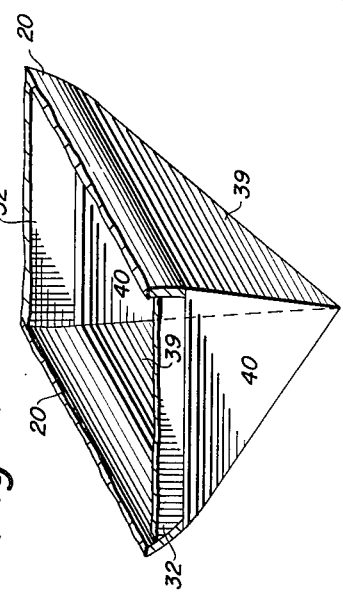
INVENTOR.
Ralph E. Scales Oct. 26, 1965  R. E. SCALES  3,213,820
CONTAINER FOR TRANSPORTING BULK DRY GRANULAR MATERIAL
Filed May 28, 1963  3 Sheets-Sheet 3

INVENTOR.
*Ralph E. Scales*

United States Patent Office 3,213,820
Patented Oct. 26, 1965

3,213,820
CONTAINER FOR TRANSPORTING BULK DRY GRANULAR MATERIAL
Ralph E. Scales, Beaumont, Tex., assignor, by mesne assignments, to Bethlehem Steel Corporation, a corporation of Delaware
Filed May 28, 1963, Ser. No. 283,808
3 Claims. (Cl. 114—73)

This invention relates in general to a cargo vessel for transporting bulk dry granular material and in particular to a cargo vessel especially designed to transport and facilitate handling of such material by means of a pressurized system such, for example, as that disclosed in U. S. Patent No. 1,898,356, issued to Fickey in 1933.

An important factor in the transportation of bulk granular material is the provision of an arrangement of cargo bins which will efficiently utilize the available volume. In addition when a pressurized system is used to handle such material the bins should be designed to insure the proper unloading of the material and to withstand the internal pressures involved. Heretofore it was customary to utilize a plurality of individual vertical cylindrical tanks as disclosed in U. S. Patent No. 2,073,982 issued to Woodruff in 1937. While this arrangement was satisfactory from an operating viewpoint it did not utilize the available space efficiently. This invention provides an arrangement of cargo bins for bulk granular material which will efficiently utilize the available space and also allow a pressurized system to function properly in the loading and unloading of the material from the cargo bins. This is accomplished by providing a horizontal substantially cylindrical tank, subdividing this tank into a plurality of separate cargo bins with adjacent bins having a common bulkhead and supplying each cargo bin with a hopper shaped bottom which tapers downwardly and inwardly to a point.

An object of this invention is to provide a cargo vessel which will economically and efficiently transport bulk granular material.

Another object of this invention is to provide for the economical and efficient transportation of bulk granular material which will be handled by a pressurized system.

Still other and further objects of this invention will appear in the specification and claims.

Figure 1:
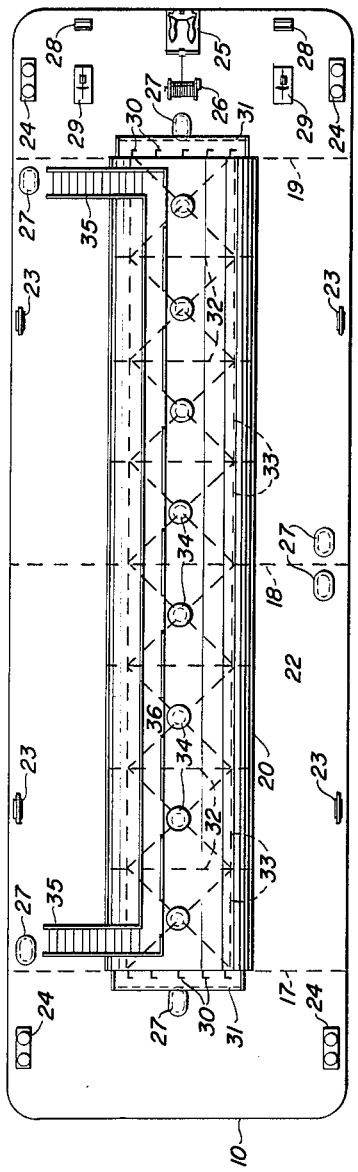
Figure 2:
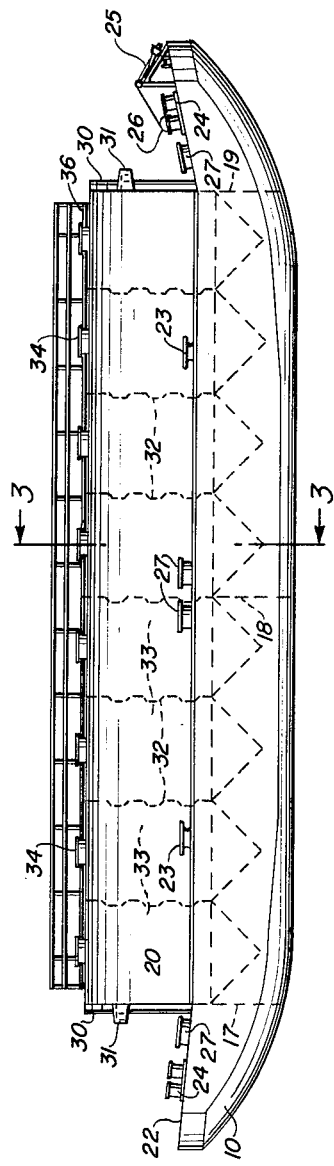
Figure 6:
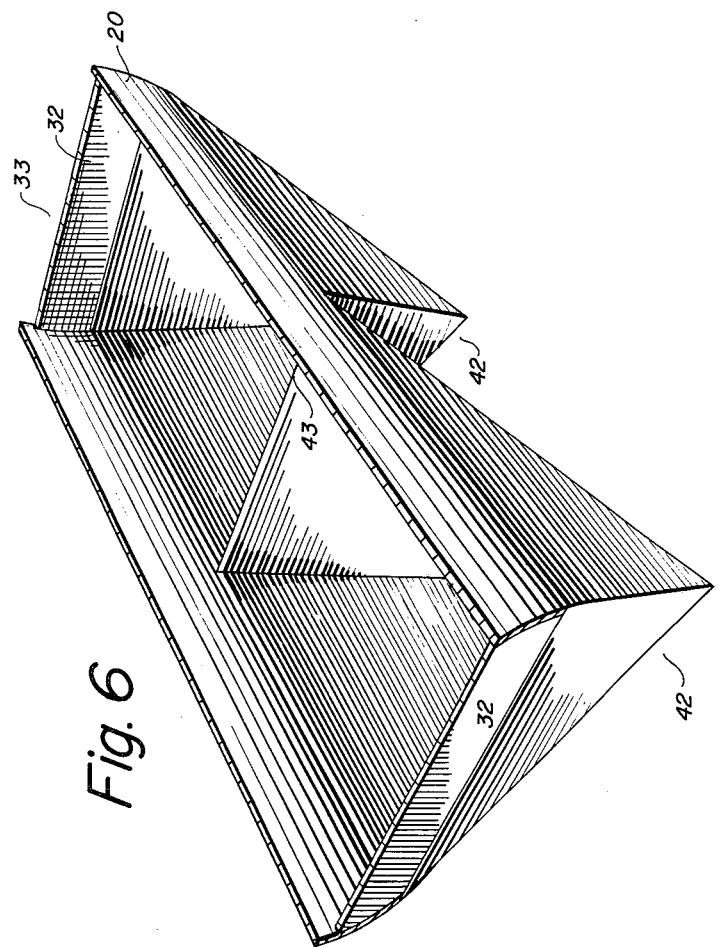

In the drawings:
FIG. 1 is a top plan view of the barge.
FIG. 2 is an elevation view of the barge of FIG. 1.
FIG. 3 is a fragmental sectional view taken on the line 3—3 of FIG. 2.
FIG. 4 is a fragmental section oblique view showing the hopper shaped bottom of FIGS. 1, 2 and 3.
FIG. 5 is a view similar to FIG. 4 but showing an alternate shape for the hopper bottom of the cargo bins.
FIG. 6 is a view similar to FIG. 4 but showing another alternate shape for the hopper bottom of the cargo bins.

Referring to the drawings, reference numeral 10 represents the hull of a barge. As shown in FIG. 3, the barge is suitably strengthened by the cooperation of center girder 11, longitudinals 12, stiffeners 13, transverse members 14, vertical members 15 and diagonal member 16. As best shown in FIGS. 1 and 2 the barge is provided with watertight hold bulkheads 17, 18 and 19 located in substantial alignment with the aft, center and fore location of tank 20. As shown in FIG. 3 the watertight hold bulkheads are suitably stiffened by vertical stiffeners 21. Arranged on the deck 22 of the barge are the usual barge equipment including cleats 23, doublebitts 24 and anchor 25. Winch 26 is suitably mounted to facilitate the handling of anchor 25. The usual closed chocks 28 and towing pads 29 are properly positioned on deck 22. To permit entrance to the various sections of the hold of the barge a plurality of manholes 27 are provided.

Mounted on the barge and rigidly attached thereto in any suitable manner is a substantially cylindrical tank 20. Tank 20 is disposed longitudinally of the barge and extends above and below deck 22. A plurality of transverse bulkheads 32 are spaced within the tank 20 and divide the tank 20 into a plurality of cargo bins 33. Thus there is formed within the tank 20 a plurality of separate cargo bins 33 with adjacent cargo bins having a common transverse bulkhead. The transverse bulkheads 32 which form the ends of tank 20 are suitably strengthened by vertical and horizontal stiffeners 30 and 31 respectively. As shown in FIG. 2 the transverse bulkheads 32, between cargo bins 33 are made from corrugated metal which provides adquate strength and rigidity without additional stiffening members. Also the corrugations of transverse bulkheads 32 are so shaped as to prevent material from collecting thereon. Each cargo bin 33 is provided with a manhole 34 which provides an access to the interior thereof. It is understood of course that other or additional openings will be provided in order to properly apply a selected pressurizing system and may also be provided for other reasons such as to facilitate cleaning of the cargo bins 33. In order to make manholes 34 readily accessible, ladders 35 extend from deck 22 at points adjacent the ends of tank 20 to a walkway 36 which extends above tank 20 and adjacent manholes 34.

As shown in the drawings and in particular FIG. 4 each cargo bin has a hopper shaped bottom so attached to the cylindrical portion of tank 20 and to transverse bulkheads 32 as to avoid any ledge or surface which could collect the bulk granular material and prevent the complete unloading of the material from the cargo bin. In the preferred embodiment the hopper shaped bottom will comprise an inverted rectangular pyramid with two opposite sides of the base of the pyramid attached to the cylindrical portion of the tank 20 and the sides 39 of the pyramid which includes these two opposite sides of the base being tangent to said cylindrical portion. The other two opposite sides of the base of the pyramid are located substantially beneath transverse bulkheads 32 and are attached thereto. In determining the minimum slope of the sides of the pyramid, i.e. the angle which the sides of the pyramid make with a horizontal line, the angle of repose of the bulk granular material to be transported is controlling. This minimum slope should be greater than the angle of repose of the material being transported in order to allow the material to settle to the bottom of the bin during unloading. Thus the size of the inverted rectangular pyramid is determined by selecting the proper minimum slope of the sides of the pyramid 39 and 40 in view of the angle of repose of the material and providing the proper dimensions for the sides of the base of the pyramid to conform with the requirement that two opposite sides 39 of the pyramid be tangent to the circular cross section of the tank 20 and the two opposite sides of the base of the pyramid included in sides 40 of the pyramid be located substantially beneath adjacent transverse bulkheads 32.

While it is probably more economical to provide an inverted rectangular pyramid for the hopper shaped bottom of the cargo bins it is possible to provide a hopper shaped bottom of a different shape. FIG. 5 shows an alternative shape. The hopper shaped bottom of FIG. 5 comprises a cone 37 and a transition portion 38 connecting the cone 37 to the rectangular opening in a cargo bin. The minimum slope of the sides of the hopper bottom shown in FIG. 5 should be greater than the angle of repose of the material within the cargo bin as was discussed above for the rectangular pyramid of FIG. 4. Also two opposite sides 41 of the hopper are tangent to the cylindrical tank 20 and the hopper extends between adjacent bulkheads 32 as described above for the inverted rectangular pyramid hopper.

It may be desirable under certain operating and material handling conditions to provide a cargo bin which includes a bottom portion having a plurality of hoppers. Such an arrangement is shown in FIG. 6 wherein the bottom portion of a cargo bin 33 includes a plurality of inverted rectangular pyramids 42. As noted above with respect to FIG. 4 two sides of each inverted pyramid 42 are tangent to the cylindrical tank 20 and the slope of the sides is greater than the angle of repose of the bulk granular material to be transported. Furthermore, the base of adjacent inverted rectangular pyramids 42 have a common side 43 and the side of the base of the inverted rectangular pyramid which is at the end of the cargo bin is located beneath transverse bulkhead 32. This arrangement eliminates any substantial horizontal surface on which material could collect and prevent a proper unloading of the cargo bin.

While the above description has been directed towards a barge it is obvious that other types of vessels can advantageously utilize the arrangement disclosed.

Although I have described my invention hereinabove in considerable detail, I do not wish to be limited narrowly to the exact and specific particulars disclosed, but I may also use such substitutes, modifications, or equivalents as are included within the scope and spirit of the invention or pointed out in the appended claims.

I claim:
1. In a container for handling bulk granular material by means of a pressurized system
   (a) a longitudinally disposed substantially cylindrical tank,
   (b) a plurality of transverse bulkheads spaced wholly within said tank to form separate cargo bins with adjacent bins having a common transverse bulkhead,
   (c) each of said cargo bins having a bottom portion in the shape of an inverted rectangular pyramid,
   (d) the distance between two opposite sides of the base of said inverted rectangular pyramid being substantially equal to the distance between adjacent transverse bulkheads,
   (e) the opposite sides of said inverted rectangular pyramid which include the other two opposite sides of said base being tangent to said cylindrical tank,
   (f) the minimum slope of the sides of said inverted rectangular pyramid being greater than the angle of repose of said bulk granular material, and
   (g) means providing access to said cargo bins.
2. The arrangement as described in claim 1 wherein the bulkheads of subparagraph (b) are corrugated.
3. In a container for handling bulk granular material by means of a pressurized system
   (a) a longitudinally disposed substantially cylindrical tank,
   (b) a plurality of transverse bulkheads spaced wholly within said tank to form separate cargo bins with adjacent bins having a common transverse bulkhead,
   (c) each of said cargo bins having a bottom portion in the shape of a plurality of inverted rectangular pyramids,
   (d) the sum of the distances between two opposite sides of the base of each inverted rectangular pyramid being substantially equal to the distance between adjacent transverse bulkheads,
   (e) the opposite sides of each inverted rectangular pyramid which include the other two opposite sides of the base being tangent to said cylindrical tank,
   (f) the minimum slope of the sides of said inverted rectangular pyramids being greater than the angle of repose of said bulk granular material, and
   (g) means providing access to said cargo bins.

References Cited by the Examiner

UNITED STATES PATENTS

| | | | |
|---|---|---|---|
| 847,677 | 3/07 | Maytham | 114—73 |
| 1,391,946 | 9/21 | Frear | 114—75 X |
| 1,443,500 | 1/23 | Phillips | 220—5 |
| 2,018,865 | 10/35 | Odenbach | 114—72 |
| 2,899,695 | 8/59 | Nicol | 9—4 |

FERGUS S. MIDDLETON, *Primary Examiner.*

MILTON BUCHLER, *Examiner.*